April 11, 1961   J. P. WHITTALL   2,979,013
REMOTE ACTUATED SNAP-ON ATTACHMENT
Filed June 10, 1959
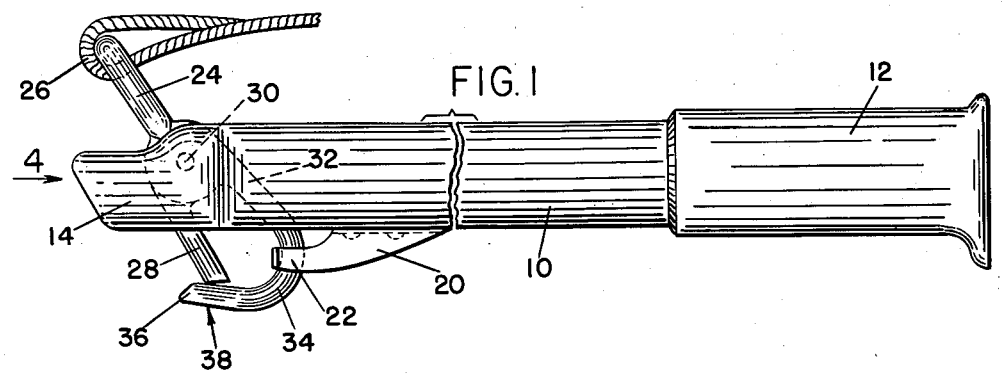
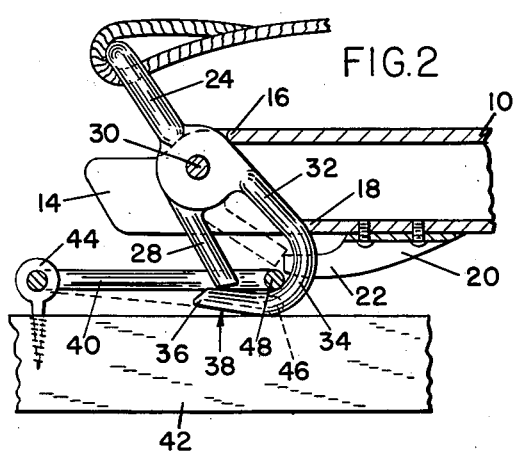
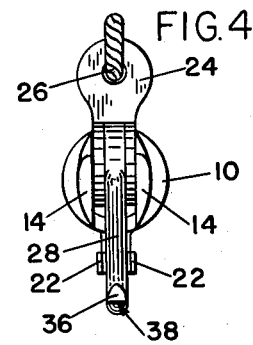
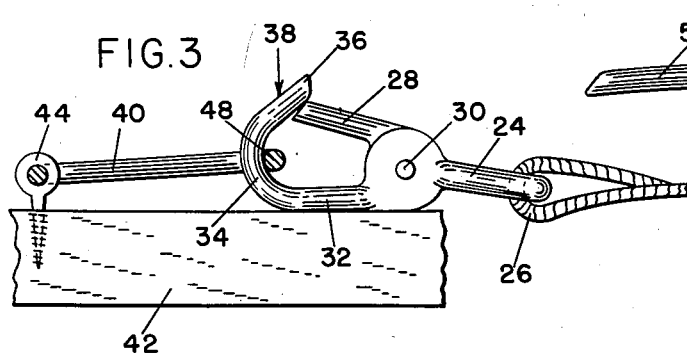
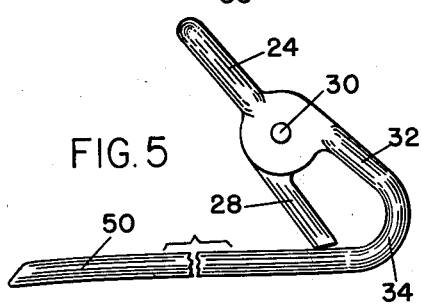
INVENTOR
JAMES P. WHITTALL
*by Charles R. Fay,*
ATTORNEY United States Patent Office 2,979,013
Patented Apr. 11, 1961

2,979,013
REMOTE ACTUATED SNAP-ON ATTACHMENT
James P. Whittall, 40 N. Brigham Hill Road, North Grafton, Mass.
Filed June 10, 1959, Ser. No. 819,344
3 Claims. (Cl. 114—221)

This invention relates to a device for the remote attachment of a cable or the like to an object.

The remote attachment is achieved by two devices, to wit:
(1) A snap fastener with elongated shank;
(2) A connector, capable of holding and releasing this snap fastener, being attached to a rod or the like in such a manner that the bight of the snap fastener faces forward and away from the user.

The attachment is accomplished by the forward motion of the rod to connect the snap fastener automatically to a ring, eye, bar, cable, rope, or any member; and then, by retracting the rod to cause separation of the snap fastener from the connector, and a cable or the like attached to the snap fastener may be used to fasten any two objects together, such as a boat to a dock or mooring.

Another object of the invention resides in the provision of a new and improved fastener having an extended lip or shank to facilitate the action thereof.

Other objects and advantages of the invention will appear hereinafter.

The parts used to accomplish this attachment may be of any material, the only requisite being that each part be made of a material that will permit that part to perform the function required of it.

In carrying out the present invention, it is to be understood that the parts thereof may assume many different forms and relationships and that the illustration herein is only in exemplification thereof for purposes of explaining the principle of operation of the invention.

Reference is to be had to the accompanying drawings, in which—

Fig. 1 is a view in elevation illustrating the snap fastener in position on the rod, hereinafter called the handle;

Fig. 2 is a view partly in section illustrating the action of the device of Fig. 1;

Fig. 3 is another view in elevation illustrating the snap fastener as it appears upon removal of the handle;

Fig. 4 is a view in front elevation, looking in the direction of arrow 4 in Fig. 1; and Fig. 5 is a view in elevation of a modified snap fastener.

In carrying out the present invention, it is to be understood that the parts thereof may assume many different forms and relationships and that the illustration herein is only an exemplification thereof for purposes of explaining the principle of operation of the invention.

There may be provided an elongated handle 10. This handle may be of any material, size or shape, and it may be of any length or diameter, but it is most conveniently made in the form of a tube and it may be provided with a grip 12 at one end thereof by which it may be manipulated. This handle may be wooden, cast, or forged metal, and other variations come within the scope of the invention.

At the end of the handle portion 10 opposite grip 12 the same is bifurcated, e.g. as by cutting through the top surface of the tube and the bottom surface thereof along the lines as perhaps best illustrated in Fig. 2. The bifurcations are illustrated at 14 and the same are spaced as shown in Fig. 4. However, the material of the tube forms an abutment at the top of the tube, this being indicated at 16; and at the bottom of the tube there is a similar abutment formed at 18.

At the lower side of the tube, there is formed a spring clip of well known kind as indicated at 20 and this may be fastened in any way desired, but it is to be observed that the holding arms 22 thereof are arranged in a predetermined relationship with respect to the abutment 18. All this mechanism may be a separate unit and attached to the elongated handle 10, by one of several different well-known methods.

In the form of the invention shown herein, the connecting means is illustrated as a spring or swivel snap fastener which in this case is provided with an eye 24. This eye 24 may be rigid, as illustrated, or swiveled, this eye to be secured to whatever may be desired such as a cable, line, etc. as at 26.

The snap fastener also includes a snap finger 28 either resilient per se or pivoted at 30 to the main body portion of the snap fastener and the main body portion extends downwardly forming a shank as for instance at 32, thence curving forwardly more or less as is usual at 34 to form a bight, but terminating in this invention in an elongated and narrowed nose 36. This nose may or may not be pointed, but it is elongated and reduced in section, so that it forms a more or less easy pick-up device. The bottom surface thereof as at 38 is preferably substantially flat, so that the same may rest upon an object as will be described hereinafter.

A spring (not shown) is provided for holding the snap finger in the closed position of the snap hook as indicated in Fig. 1, but it is capable of being retracted to the dotted line position of Fig. 2 in order to receive some kind of member which is to be secured.

The snap fastener is positioned between arms 14, 14 which position the same in the forwardly-facing direction as in Figs. 1 and 2, and in this position the main body portion or shank 32 of the snap fastener abuts and is positioned in inclined relation by abutments 16 and 18, see Fig. 2. In this position also, the snap arms 22, 22 of the spring fastener 20 lightly grip the main body portion at the bend and hold the same in the position shown in Figs. 1 and 2, wherein the pointed end of the hook 38 faces forwardly and the snap finger 28 also faces forwardly and extends down well below the lower portion of the handle 10 in exposed condition, ready for securement as will be described.

With the parts in the position described, it will be clear that the handle may be manipulated in such a way as to extend the snap fastener facing forwardly a good distance away from the user. Thus the device may be thrust at some object which is to be secured such as for instance a ring 40 which may be lying on an object such as a dock or wharf 42 and secured thereto in the eye 44 of a ring bolt or the like.

It will be observed that the ring 40 will lie with the dotted line portion which is indicated at 46 on the top of the deck, and by thrusting the nose 36 of the snap fastener toward it, it will lift the same up and snap the portion at 48 of the ring 40 into the bight of the hook. This is the worst condition which may be encountered because the bight of the hook may be inserted under the ring in any other portion near the eye 44 which is seen to be elevated above the deck, and it is extremely easy to thrust the snap fastener into the ring and secure it adjacent the eye 44. Any number of such hooks may be applied to the same ring without difficulty in the same manner.

When this has been done as in Fig. 2, then the handle 10 is retracted and the spring fastener 20 lets go, leaving the cable or line 26 clearly attached to the dock or other support 42 by the snap fastener as is illustrated in Fig. 3.

The nose 36 of the snap fastener may be greatly elongated in order to pick up mooring buoys or the like at a distance, as is illustrated at 50 in Fig. 5. The snap is otherwise the same as before and handled in much the same manner as by a long handle from the deck of a boat. The snap can be used in different sizes and can be utilized to connect any two objects together wherever it can receive an object in the bight of the hook.

Having thus described my invention and the advantages thereof, I do not wish to be limited to the details herein disclosed, otherwise than as set forth in the claims, but what I claim is:

1. A device of the class described comprising an elongated handle, said handle being bifurcated at one end thereof, said bifurcation including a pair of stop members one at each side of the handle, said stop members being at different distances inwardly from the end of said handle member, in combination with a separable snap fastener having a shank, said shank being positionable in the bifurcation and against said stop members and including a hook-like terminal portion including a bight, said bight being disposed at least partly exterior to the handle and the said bifurcations in order that the handle may be utilized to present the bight to an object to be secured thereto, means releasably holding the snap-fastener in its position against the stops, the bight facing the said end, and the handle releasing the snap-fastener by a manual pull on the handle when the object is secured in the snap position.

2. The device as recited in claim 1 including an elongated terminal member on the bight, and a snap finger latching means for the bight, said elongated member stopping the snap finger and extending well beyond the same.

3. A device of the class described comprising an elongated tubular handle member, said tubular handle member being bifurcated adjacent an end thereof to receive a snap fastener, a snap fastener received in said bifurcations, means for positioning said snap fastener with the bight thereof exposed and facing forwardly with respect to the bifurcated end, said handle member having grip at the opposite end thereof, said snap fastener being temporarily held and capable of being secured to an object by thrusting the same forwardly and said snap hook being detachable from the handle member by a rearward motion of the latter after the attaching motion aforesaid.

References Cited in the file of this patent
UNITED STATES PATENTS 1,852,629    Sturges  ---------------- Apr. 5, 1932